US007344054B2

(12) United States Patent
Sakai et al.

(10) Patent No.: US 7,344,054 B2
(45) **Date of Patent: *Mar. 18, 2008**

(54) POWER TOOL

(75) Inventors: Masato Sakai, Ibaraki (JP); Takeshi Matsuoka, Ibaraka (JP); Chikai Yoshimizu, Ibaraki (JP); Masanori Watanabe, Ibaraki (JP); Katsuhiro Oomori, Ibaraki (JP); Takuya Teranishi, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 10/973,237

(22) Filed: Oct. 27, 2004

(65) Prior Publication Data

US 2005/0092792 A1 May 5, 2005

Related U.S. Application Data

(63) Continuation of application No. 10/726,495, filed on Dec. 4, 2003, now Pat. No. 6,905,052, which is a continuation of application No. 10/085,582, filed on Mar. 1, 2002, now Pat. No. 6,679,406.

(30) Foreign Application Priority Data

Mar. 2, 2001 (JP) .......................... P2001-058628

(51) Int. Cl.

| | |
|---|---|
| ***A45F 5/00*** | (2006.01) |
| ***B23B 39/00*** | (2006.01) |
| ***E21B 3/00*** | (2006.01) |
| ***H02J 7/00*** | (2006.01) |

(52) U.S. Cl. ...................... 224/269; 224/268; 224/271; 408/241 R; 173/217; 320/114

(58) Field of Classification Search ............... 224/268, 224/269, 271, 904; 408/241 R; 173/217; 320/114; D8/68

See application file for complete search history.

(56) References Cited

U.S. PATENT DOCUMENTS

| | | | | |
|---|---|---|---|---|
| 1,510,978 | A | 10/1924 | Conklin | |
| 4,677,362 | A * | 6/1987 | House et al. | 320/115 |
| 5,210,532 | A * | 5/1993 | Knoedler et al. | 340/825.69 |
| 5,850,996 | A * | 12/1998 | Liang | 248/221.11 |
| 5,954,458 | A * | 9/1999 | Lee | 408/16 |

(Continued)

FOREIGN PATENT DOCUMENTS

| | | |
|---|---|---|
| JP | 8-252784 | 10/1996 |

(Continued)

*Primary Examiner*—Nathan J. Newhouse
*Assistant Examiner*—Lester L. Vanterpool
(74) *Attorney, Agent, or Firm*—McGinn IP Law Group, PLLC

(57) ABSTRACT

A power tool includes a hook portion having a hook holding portion, which is provided in a housing and has engaging teeth provided in the housing. A hook having a shaft portion is inserted into the hook holding portion and provided with fitting teeth meshing with the engaging teeth An elastic body is adapted to push the hook against a handle portion at all times, and a slip-off preventing part holding portion is adapted to move the hook in a direction of an axis thereof against a force of the elastic body and to cancel the mesh between the teeth to thereby enable the hook to turn.

20 Claims, 13 Drawing Sheets

U.S. PATENT DOCUMENTS

| | | | | |
|---|---|---|---|---|
| 6,315,179 | B1 * | 11/2001 | Hillis | 224/268 |
| 6,325,577 | B1 * | 12/2001 | Anderson | 408/241 R |
| D452,639 | S * | 1/2002 | Zurwelle | D8/68 |
| 6,502,949 | B1 * | 1/2003 | Horiyama et al. | 362/119 |
| 6,540,122 | B1 * | 4/2003 | Petersen | 224/197 |
| D475,596 | S * | 6/2003 | Ozawa et al. | D8/68 |
| D477,205 | S * | 7/2003 | Sakai et al. | D8/68 |
| 6,688,407 | B2 * | 2/2004 | Etter et al. | 173/170 |
| 2002/0179659 | A1 * | 12/2002 | Shaw | 224/269 |

FOREIGN PATENT DOCUMENTS

JP 08252784 A * 10/1996

* cited by examiner

P1
2
4
21
M1
20
28
30
31
47
M2

POWER TOOL

The present Application is a Continuation Application of U.S. patent application Ser. No. 10/726,495 filed on Dec. 4, 2003 now U.S. Pat. No. 6,905,052, which was a Continuation Application of Ser. No. 10/085,582 filed on Mar. 1, 2002, now U.S. Pat. No. 6,679,406.

BACKGROUND OF THE INVENTION

1. Field of the Invention

The present invention relates to a power tool having a hook potion that is hookable onto a waist belt of an operator.

2. Description of the Related Art

A conventional power tool has a hook portion for hooking the power tool onto a waist belt of an operator. When this hook portion is fixedly placed in a state in which the hook portion projects from, for example, a power tool body, the hook portion comes in contact with peripheral members during an operation. Especially, when an operation is performed in a narrow place, the hook portion hinders an operator from performing an operation. Thus, the conventional power tool has a problem in that the workability is lowered. Further, because the hook portion is an obstacle to an operation, a certain conventional power tool is adapted so that the hook portion is detached therefrom as needs arise. However, such a conventional power tool has encountered a problem in that the hook portion is missing. Thus, another conventional power tool is adapted so that when the hook portion is unnecessary, the hook portion is accommodated therein or moved to a position, at which the hook portion is not a hindrance to an operation.

An example of the aforementioned hook portion is described hereinbelow by referring to FIG. 17. This hook portion comprises a hook 4 formed by coating the entire perimeter of a catching piece 2, which is formed by bending a threaded bar-like iron material, with a soft material 3, and also comprises a holding nut 5 for holding the hook 4, and a slip-off preventing nut (not shown), which is provided in the housing 1, for preventing the hook 4 from slipping off the power tool. The catching piece 2 of this hook portion can be turned from an accommodating position, which is almost adjacent to a battery 18, to a gap formed between the catching piece 2*b* and a handle 9, as indicated by a two-dot dashed line. Moreover, at the position of this gap, the catching piece 2 projects therefrom in such a way as to be able to be caught therein. Furthermore, stability is obtained by hooking the catching piece to the belt when the hook 4 is in a state in which a tip end thereof is directed to the center of gravity of the power tool. Thus, even when a continuous screw attachment 7 is removed from a power tool body, so that the position of the center of gravity of the power tool is changed, the power tool is adjusted to a stable position by turning the catching piece 2*b*. Furthermore, it is often that the catching piece 2 of the hook 4 projects most sideways from the handle 9. Therefore, even when the power tool is put on the slope of a tilted roof, the soft material 3, with which the hook 4 is coated, provides antislipping action. Moreover, when the power tool is put on a member, such as a decorative panel, the soft material 3 also provides protecting action in such a way as to prevent the member from being damaged.

Further, a certain conventional power tool is adapted so that the entire hook of a hook portion having been projected from and fixed to a power tool body is slidably accommodated in a concave portion provided in the power tool body, as disclosed in JP-A-2000-167785.

Moreover, differently from the conventional hook of the accommodating type, another example of a conventional hook is adapted in such a way as to be able to turn around the outer periphery of a nearly-cylindrical motor housing of a power tool and to be positioned at a plurality of places by catching a hook portion, as disclosed in JP-A-6-285774.

Furthermore, another conventional power tool has a hook portion of the turning type having a convex or concave portion, which can be fitted into a left-side surface of a motor housing having a convex or concave portion, and a hook is detachably attached to this hook portion with a single motion, as disclosed in JP-A-9-225861.

On the other hand, a tip end of the tip tool, such as the bit, is liable to damage in a screwing operation. Thus, it is necessary to exchange the bit. However, it is trouble some that a bit attached to the power tool used during high-place work performed on a stepladder and a scaffold is replaced with another bit put on the ground. Further, in the case that a replacement bit is put into a pocket, there is high possibility that the replacement bit is dropped and lost when, for instance, screws are taken out of the pocket. Thus, there is provided a conventional power tool adapted so that a replacement bit is accommodated in a housing, as disclosed in JP-A-9-216171. A bit accommodating portion of this power tool is formed in a battery receiving portion provided in a lower portion of a handle so that ribs are provided on both side surfaces thereof around a bit so as to prevent the bit from being caught in clothes and dropped, and that the bit is almost completely embedded therein. Additionally, a metal latch fitting is provided in this bit accommodating portion in such a way as to pressure-attach and hold the bit at a single place. Thus, when the bit is taken out, the metal latch fitting is bent and drawn out in the radial direction of the axis of the bit.

The hook portion shown in FIG. 17 has encountered a problem that each time when the catching piece is turned for accommodation, pullout, and adjustment thereof, it is necessary and troublesome to perform an operation of rotating a holding nut by using a tool, such as a spanner.

Further, although the hook portion disclosed in JP-A-2000-167785 is stable and constructed so that the pullout and accommodation of the hook are easily performed, an accommodating portion in which a hook is accommodated, a guide portion in which the hook can slide, and a supporting portion for supporting the hook should be embedded therein. Thus, this conventional hook portion has encountered a problem that the size of the power tool increases.

Moreover, the conventional hook portion disclosed in JP-A-6-285774 is constructed so that the hook is turned around a nearly cylindrical motor housing of the power tool, and that the hook is projected therefrom in such a way as to provide a uniform gap between the hook and the outer periphery of the motor housing. However, this hook portion uses a leaf spring for elastically catching the gear provided on the hook. Thus, this conventional hook portion has encountered a problem that when a force is applied in the turning direction of the hook, the hook is easily rotated and unstable. Furthermore, this conventional hook portion has encountered another problem that when the hook is locked by a manually-operated lock knob, an operator needs to turn the hook by using one hand during the lock state is canceled by using the other hand, and that thus the operability thereof is poor.

Furthermore, in the case of the hook portion disclosed in JP-A-9-225861, the position, at which the hook is mounted, is changed so that a narrow object to be hooked is caught in the gap formed between the hook and the motor housing. On the other hand, a wide object to be hooked is caught in the gap formed between the hook and the handle. However, the position of the turned hook is held by an elastic locking force applied between the materials. Thus, this conventional hook portion has encountered a problem that when a force is applied to the hook in the turning direction, the hook is easily turned and thus has poor stability. Moreover, although the holding portion enabled to be detached by performing a one-touch operation is provided on the left-side surface of the motor housing, it is necessary for enhancing the operability thereof for both a right-handed person and a left-handed person to provide the holding portion on the right-side surface thereof. In this case, this hook portion has encountered another problem in that the holding portion provided at the side, at which no hook is attached, hinders the operation.

On the other hand, the conventional power tool comprises a motor housing containing a motor and a gear, handle, battery, a battery receiving portion, and a bit accommodating portion, as disclosed in JP-A-9-216171. Consideration is given hereinbelow to the place at the bit accommodating portion is provided. The motor housing has no space, in which the bit is embedded, and is slid into a narrow space, in which a screwing operation is performed, so that the motor housing is unsuitable for being provided in such a way as to project from the tool body. When provided in the handle, the bit accommodating portion becomes hard to grasp. When provided in the battery, the versatility of the battery is lowered. The battery receiving portion has no space in which the bit accommodating portion is embedded. Therefore, it is preferable that the bit accommodating portion is provided in the battery receiving portion in such a way as to protrude therefrom. However, this conventional power tool has encountered a problem that when the hook shown in, for example, FIG. 17 is provided in such a power tool, a pull-out piece (see FIG. 17) of the hook hits and is in the way of accessing the bit accommodating portion. Moreover, this conventional power tool has encountered another problem that even when the pull-out piece (see FIG. 17) is provided at the side of the bit accommodating portion, a portable tool is not compact and thus, the efficiency in space utilization is poor. Furthermore, when the metal latch fitting disclosed in JP-A-9-216171 is used, the cost and time needed for assembling the fitting to the tool are high. Thus, preferably, the latch fitting is resin-molded in such a way as to be integral with the housing. However, this conventional power tool has encountered a problem that when the metal latch fitting is simply replaced with a resin-molded latch fitting, the strength of the resin is lower than that of the iron and that it is thus necessary to increase the thickness of a resin layer to the extent that the fitting can hold the bit. Conversely, it is necessary to reduce the thickness thereof so that the bit can be removed by bending the metal latch fitting. Thus, this conventional power tool has encountered another problem that such contradictory necessities for setting the thickness of the resin fitting arise. Additionally, the entire periphery of the catching piece is covered with a cap-like member made of a soft material in the example of a portable tool having the hook coated with the soft material as shown in FIG. 17. However, when the bit accommodating portion disclosed in, for instance, JP-A-9-216171 is provided in the catching piece, this conventional power tool has encountered another problem that the bit is covered with the soft material and thus disabled to be detached therefrom, and that even when a part of the soft material is cut out, a the bit accommodating portion is cracked from the place at which the soft material is cut by performing an assembling operation or by wear.

SUMMARY OF THE INVENTION

An object of the invention is to solve the aforementioned problems and to provide a power tool that is enabled to easily change the position of a hook with respect to a tool body and that excels in operability.

Another object of the invention is to provide a power tool enabled to enhance work ability and effectively use a space by causing an accommodating/holding portion provided in the hook to hold a tip tool, such as a bit.

Still another object of the invention is to provide a hook having excellent usability, in which the bit is arranged in such a way as to reliably be held in the accommodating/holding portion and to easily be detached therefrom, and to provide a detaching method therefor.

To achieve the foregoing objects, according to the invention, there is provided a power tool has a motor serving as a driving force source, a housing having a main body portion, which is adapted to accommodate the motor, and a handle portion provided in such a way as to be integral with the main body portion, and a hook to be provided in the housing. This power tool has a hook portion comprising a hook holding portion, which is provided in the housing and has engaging teeth provided in the housing, and also comprising a hook having a shaft portion, which is inserted into the hook holding portion and provided with fitting teeth meshing with the engaging teeth, an elastic body adapted to push the hook against the handle portion at all times, and a slip-off preventing part holding portion adapted to move the hook in a direction of an axis thereof against a force of the elastic body and to cancel the mesh between the teeth to thereby enable the hook to turn.

DETAILED DESCRIPTION OF THE PREFERRED EMBODIMENTS

Figure 1:
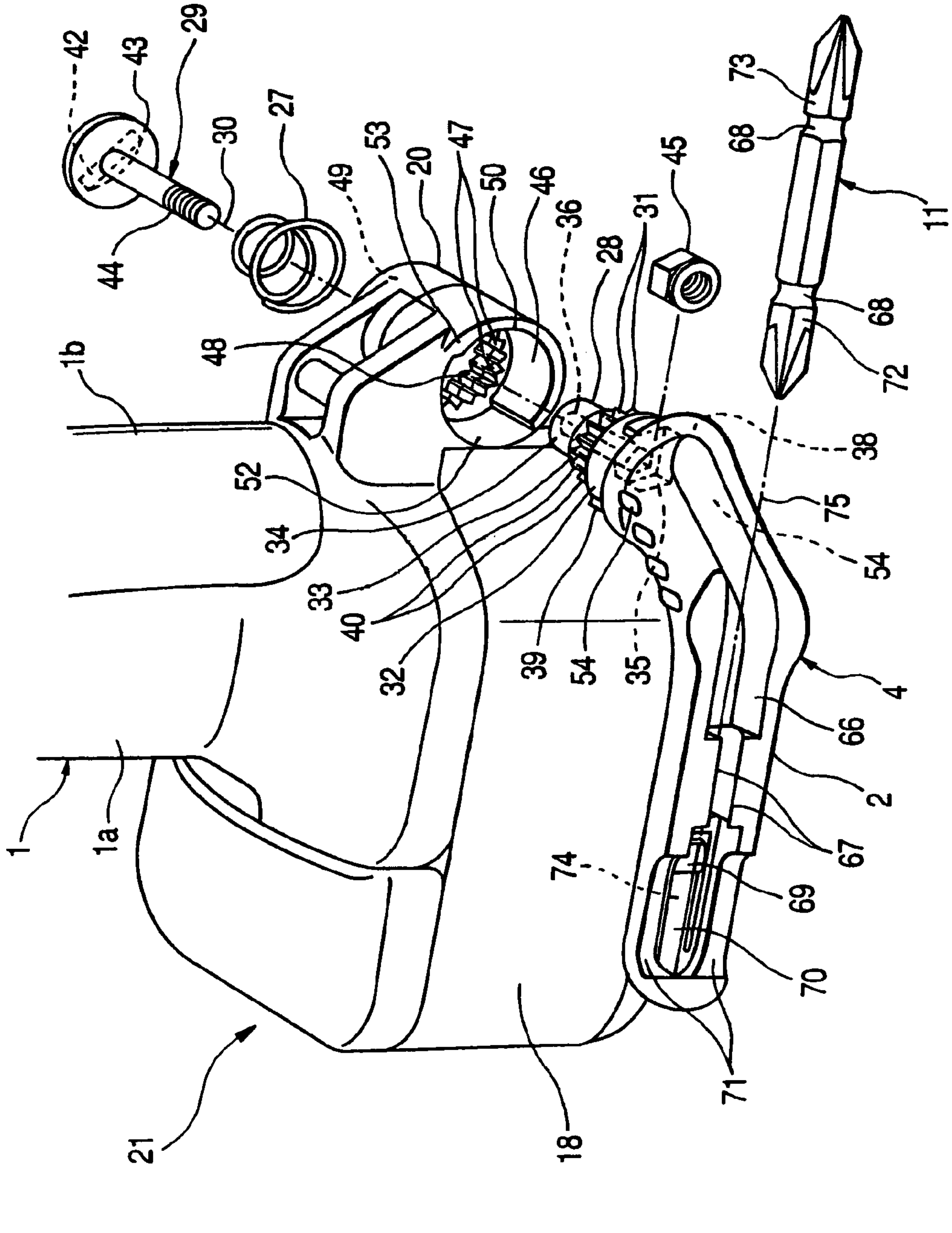
FIG. 1 is an exploded perspective view illustrating a primary part of a hook portion of a power tool according to the invention.
Figure 2:
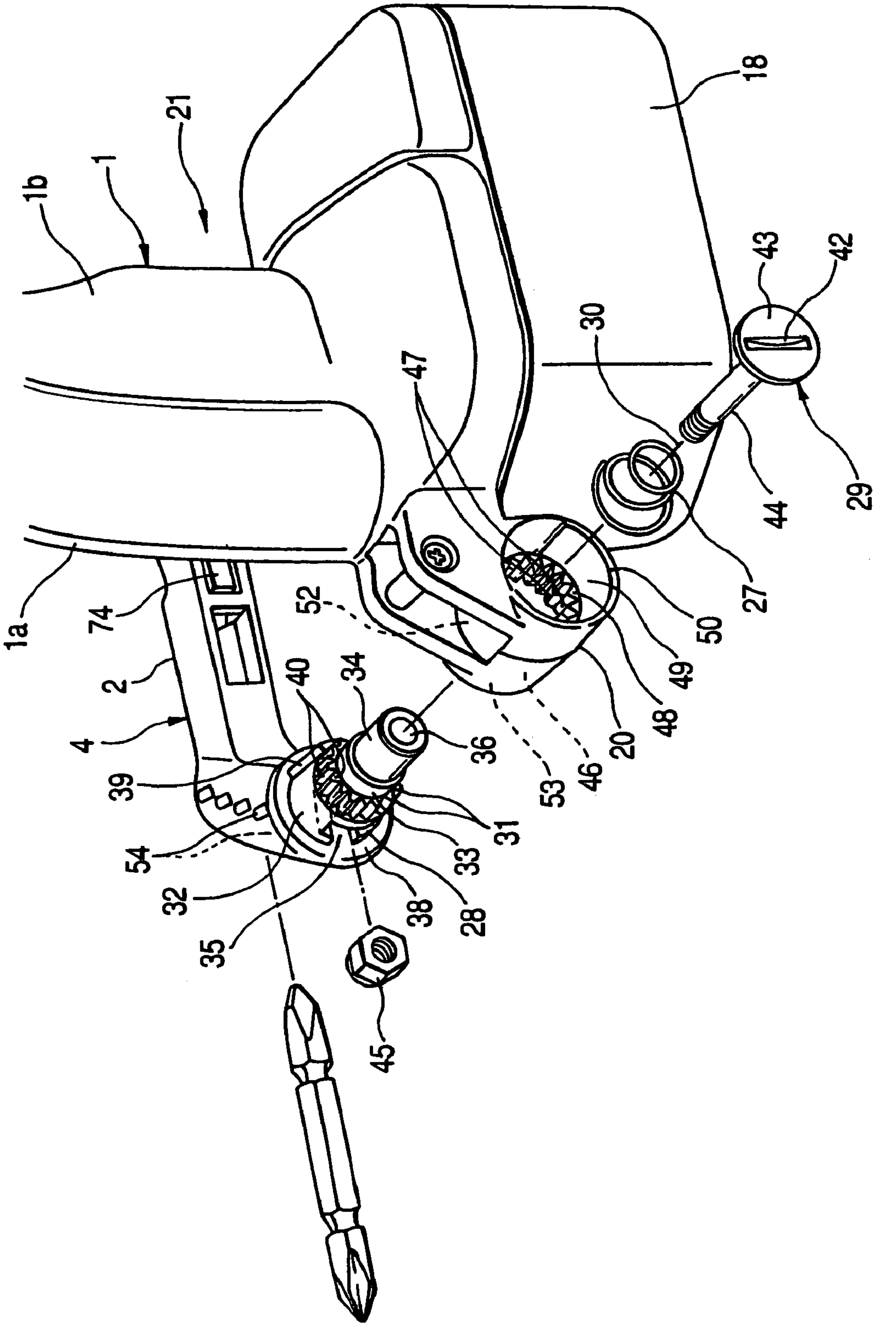
FIG. 2 is an exploded perspective view illustrating the primary part of the hook portion of the power tool according to the invention.

A power tool, such as an impact driver, according to an embodiment of the invention is described hereinbelow with reference to FIGS. 1 to 16. FIG. 1 is an exploded perspective view illustrating a primary part of a hook portion of a power tool according to the invention. FIG. 2 is an exploded perspective view illustrating the primary part of the hook portion of the power tool according to the invention.

Figures 3A, 3B, 3C:
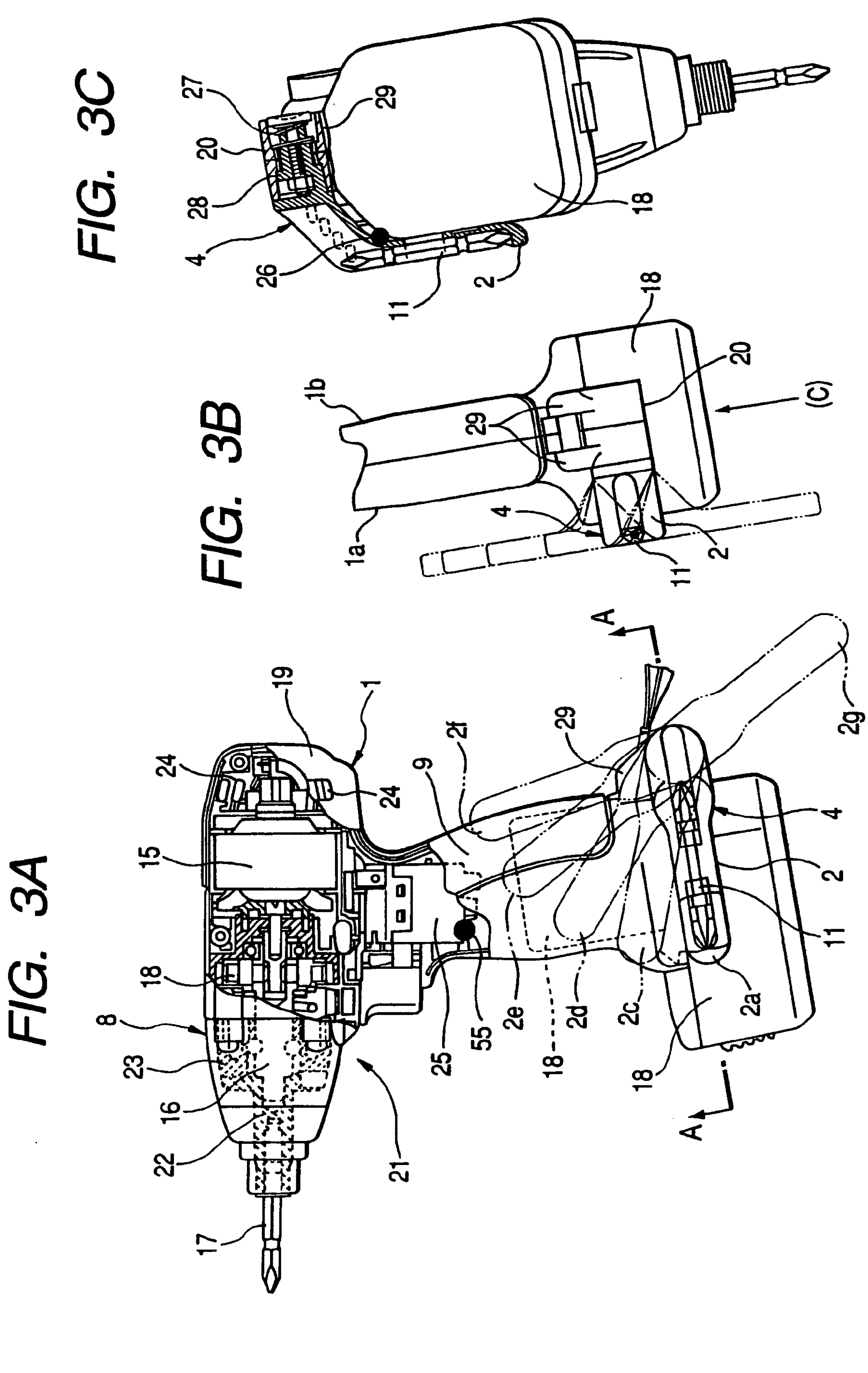
FIGS. 3A, 3B, and 3C illustrate a moving state of the hook portion according to the invention and are a plan view, a side view, and a bottom view thereof, respectively.
Figure 4A:
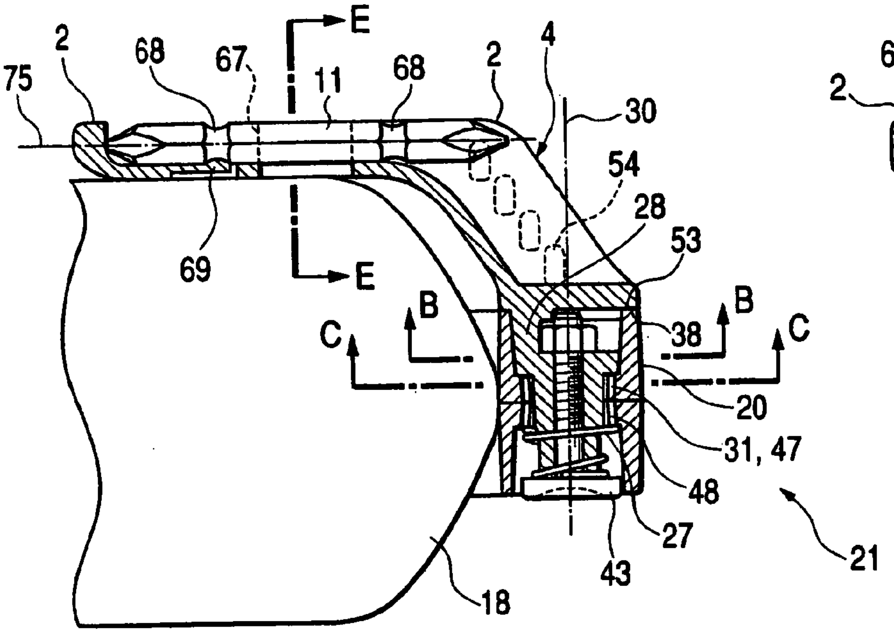
FIGS. 4A and 4B are sectional views taken on line A-A of FIG. 3A.
Figure 4B:
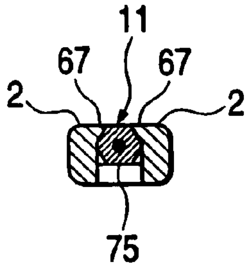
Figure 5:
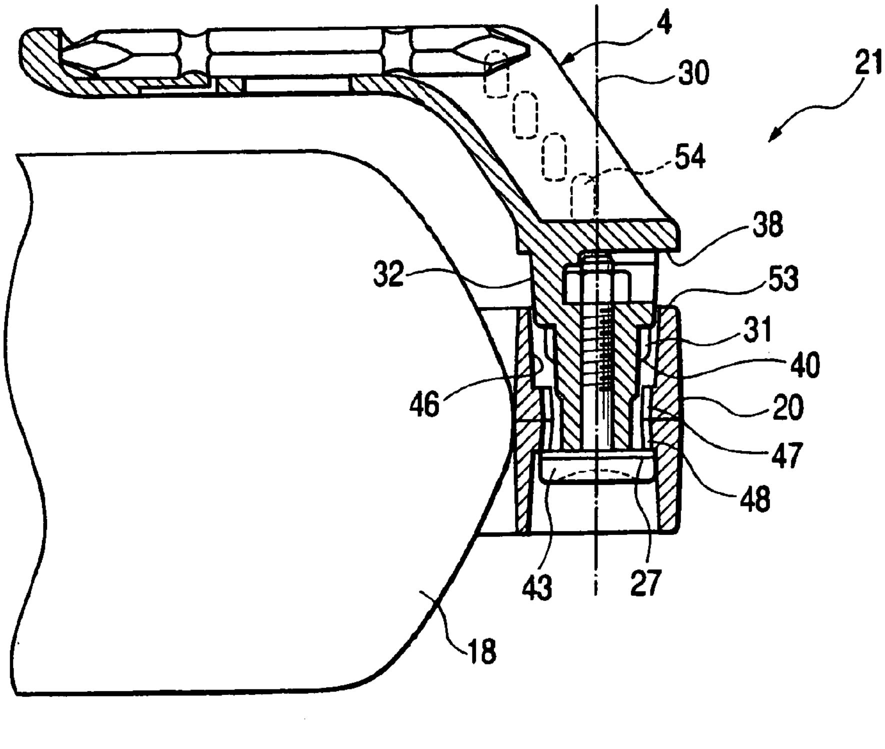
FIG. 5 is a sectional view illustrating a state of the hook portion moved in a direction, in which a spring 27 is compressed; according to the invention, and taken on line A-A of FIG. 3A.
Figure 6:
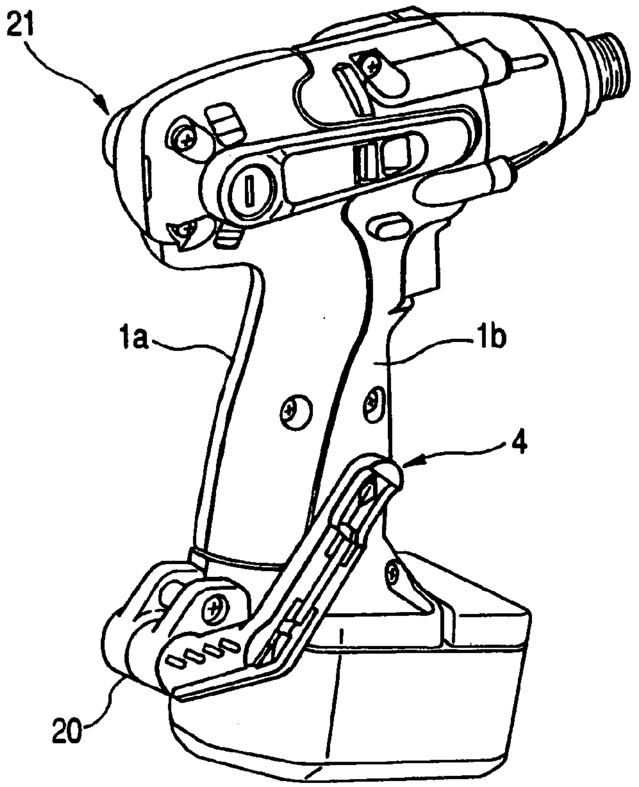
FIG. 6 is an external perspective view illustrating a state in which the hook portion according to the invention is attached to the opposite side of the power tool.
Figure 7:
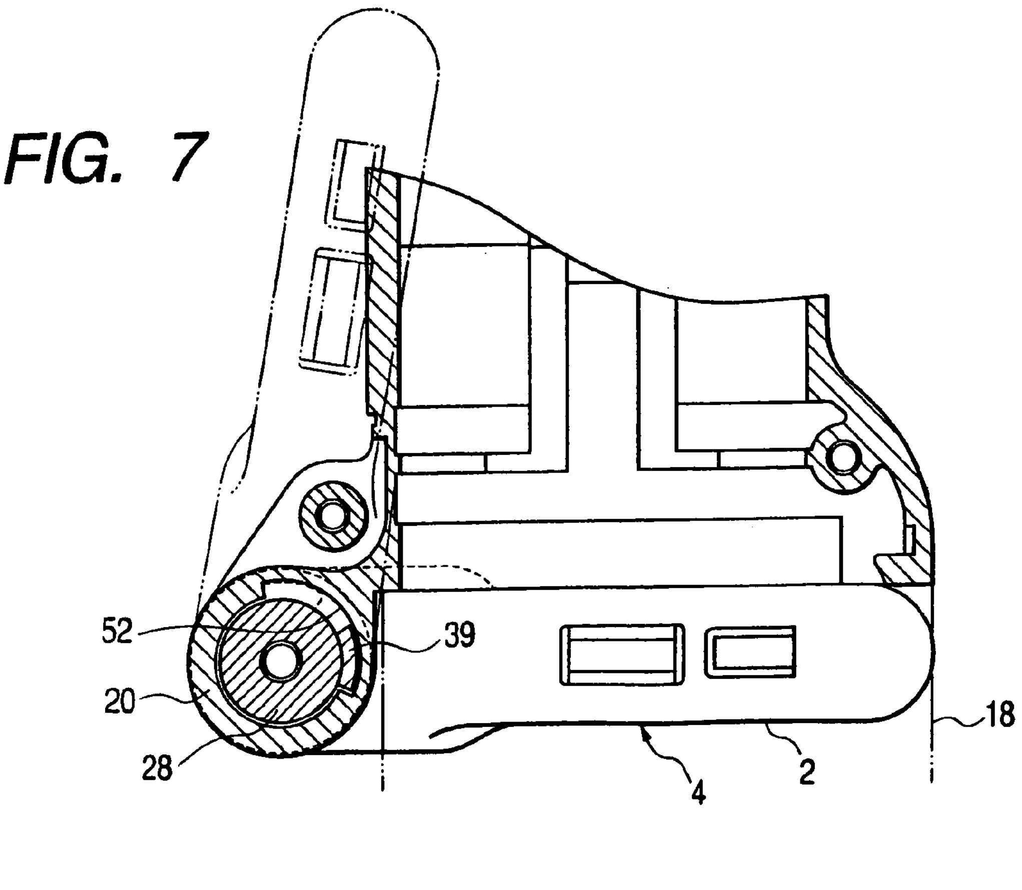
FIG. 7 is a sectional view illustrating an accommodated state or a projected state of the hook portion according to the invention, and taken on line B-B of FIG. 4A.
Figures 8A, 8B:
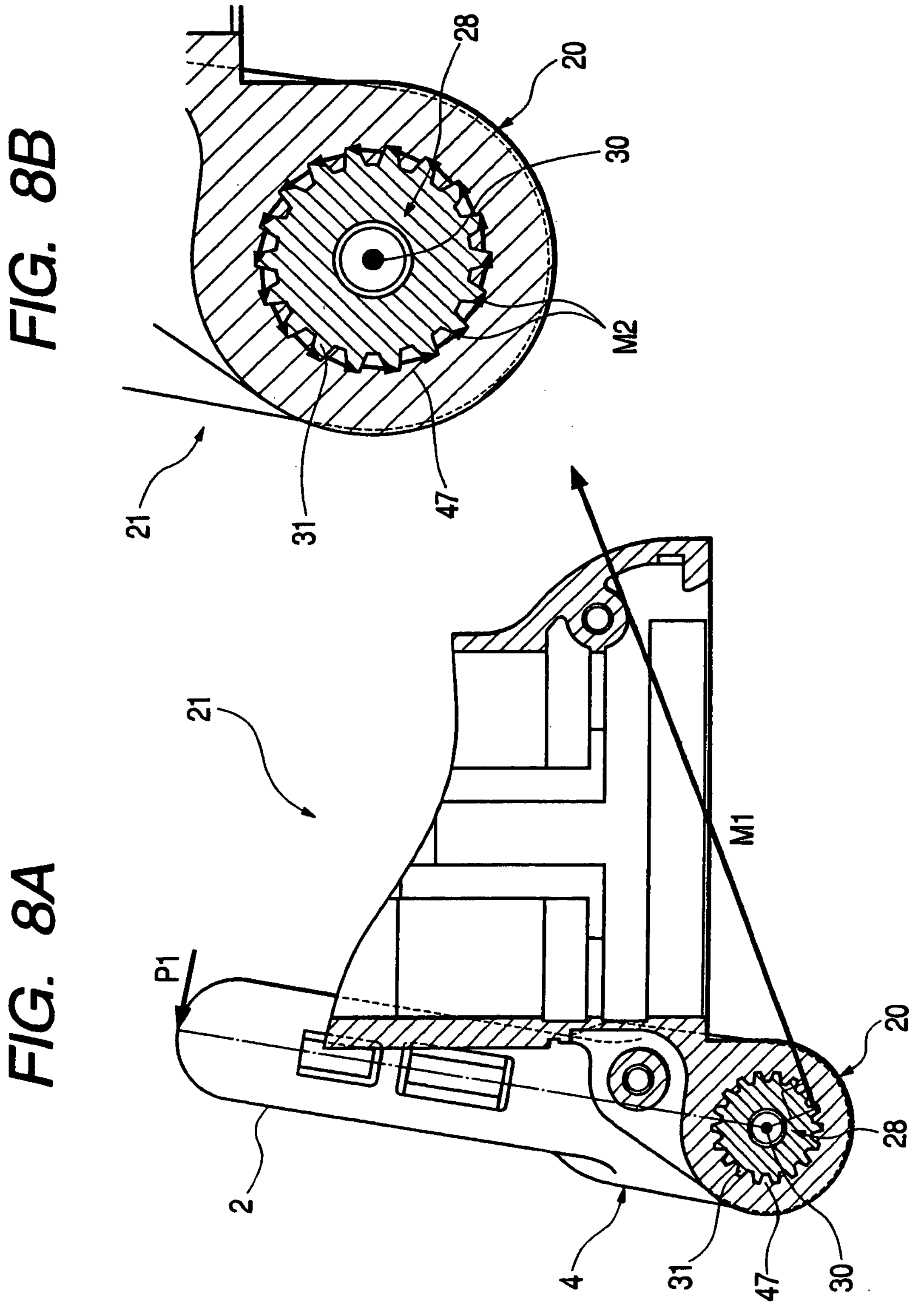
FIGS. 8A and 8B illustrate a turning part of the hook portion according to the invention, and are a sectional view taken on line C-C of FIG. 4A and a partly enlarged view showing a gear and a ring gear, respectively.
Figure 9:
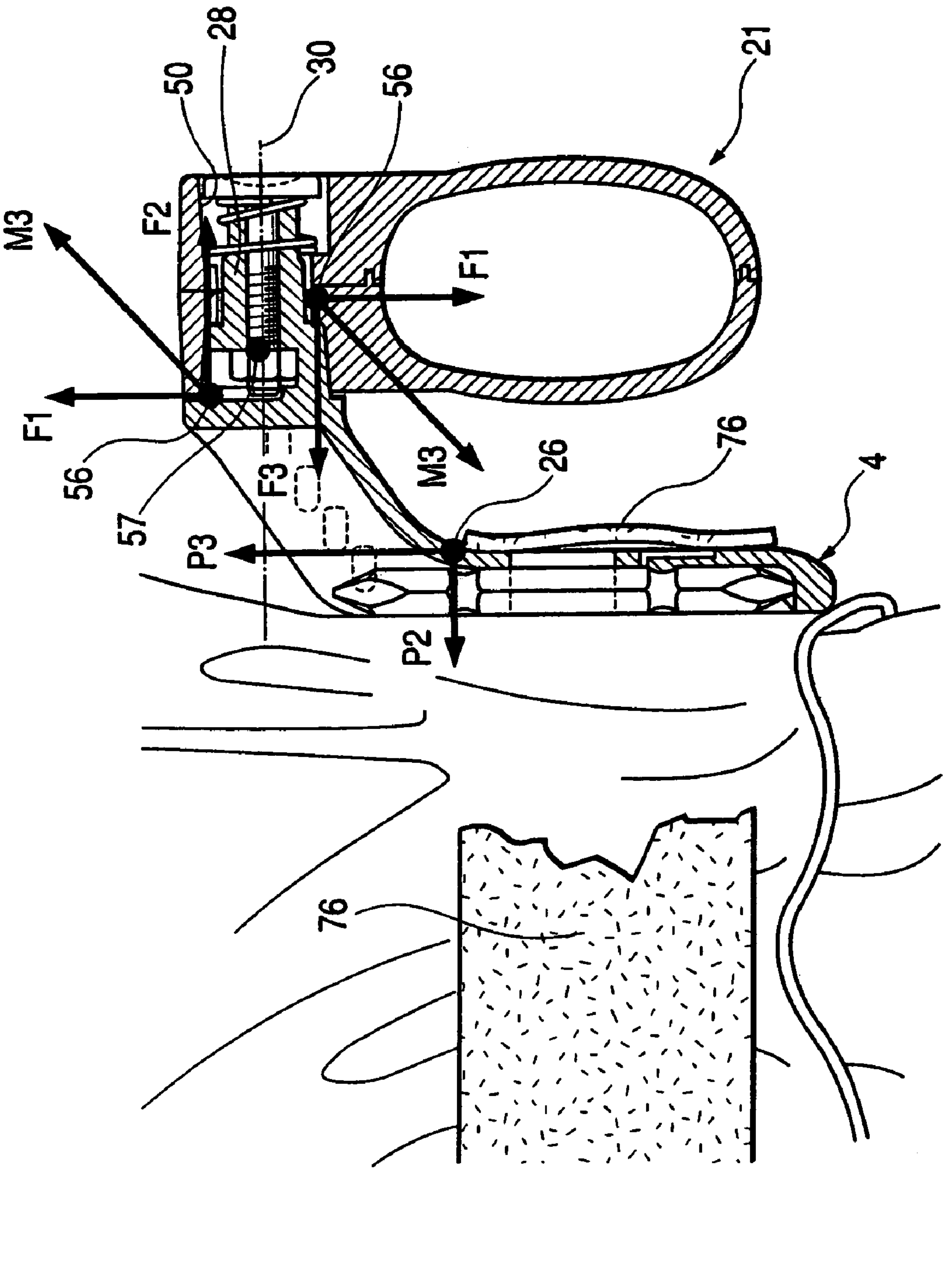
FIG. 9 is an enlarged view illustrating a primary part of the power tool in a state in which the power tool is hooked to a waist belt of an operator by using the hook portion according to the invention.
Figures 10A, 10B, 10C:
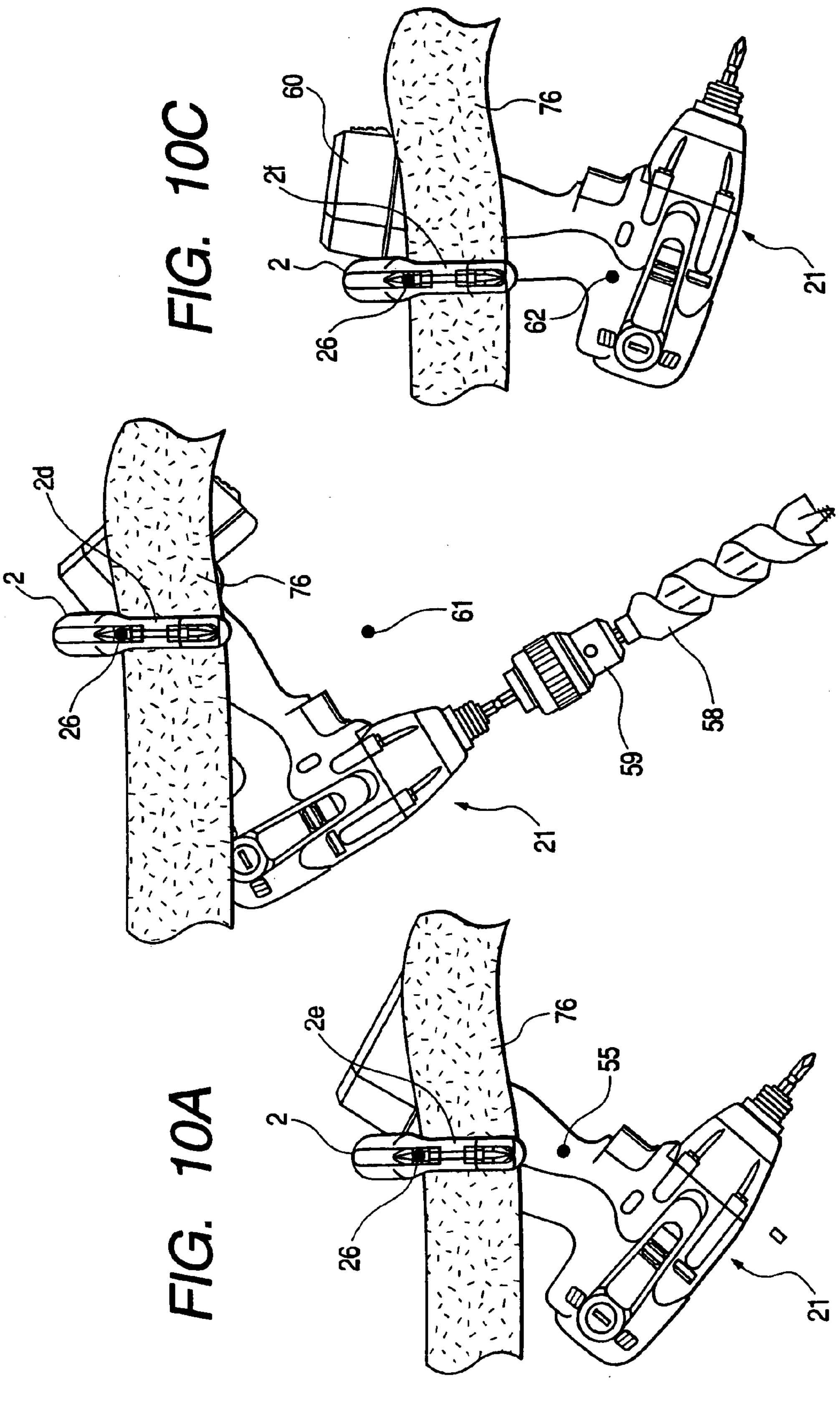
FIGS. 10A, 10B, and 10C illustrate the primary part of the power tool in the state, in which the power tool is hooked to the waist belt of an operator by using the hook portion according to the invention, and are respectively an explanatory view illustrating a state in which the power toll is hooked to the waist belt of the operator, an explanatory view illustrating a state in which a bit is removed from the power tool shown in FIG. 10A and a chuck and an auger bit are attached thereto, and an explanatory view illustrating a state in which a lightweight battery is attached to the power tool shown in FIG. 10A.
Figure 11B:
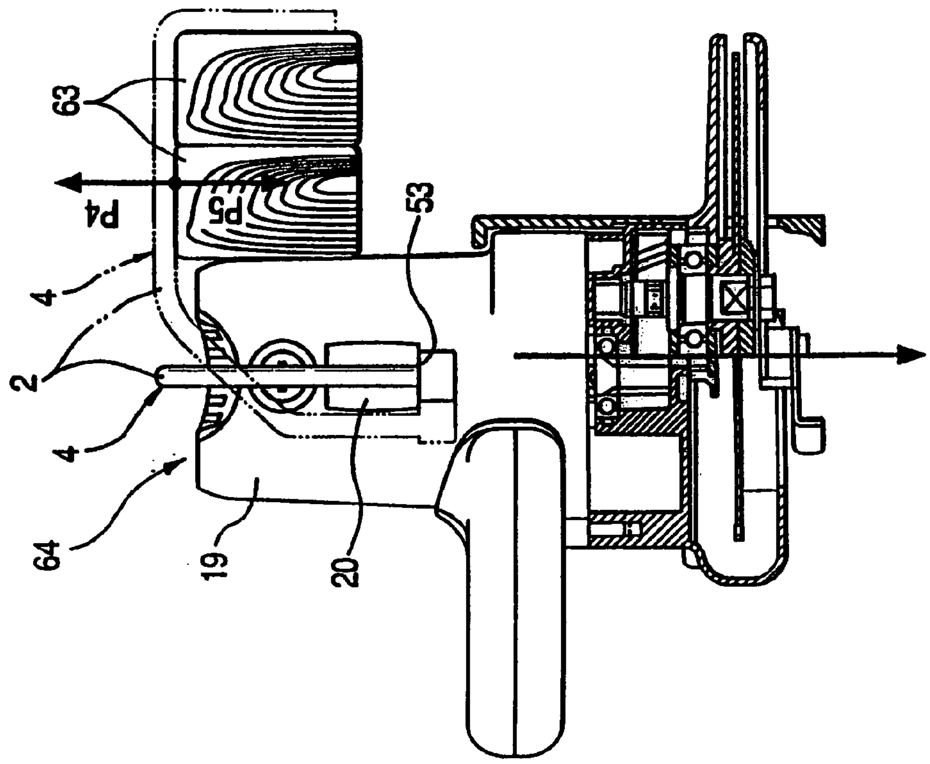
FIGS. 11A and 11B illustrate an electric circular saw having the hook portion according to the invention, and are a partly longitudinal side view thereof and a constitutional view illustrating a state in which the electric circular saw is hooked to a beam, respectively.
Figure 11A:
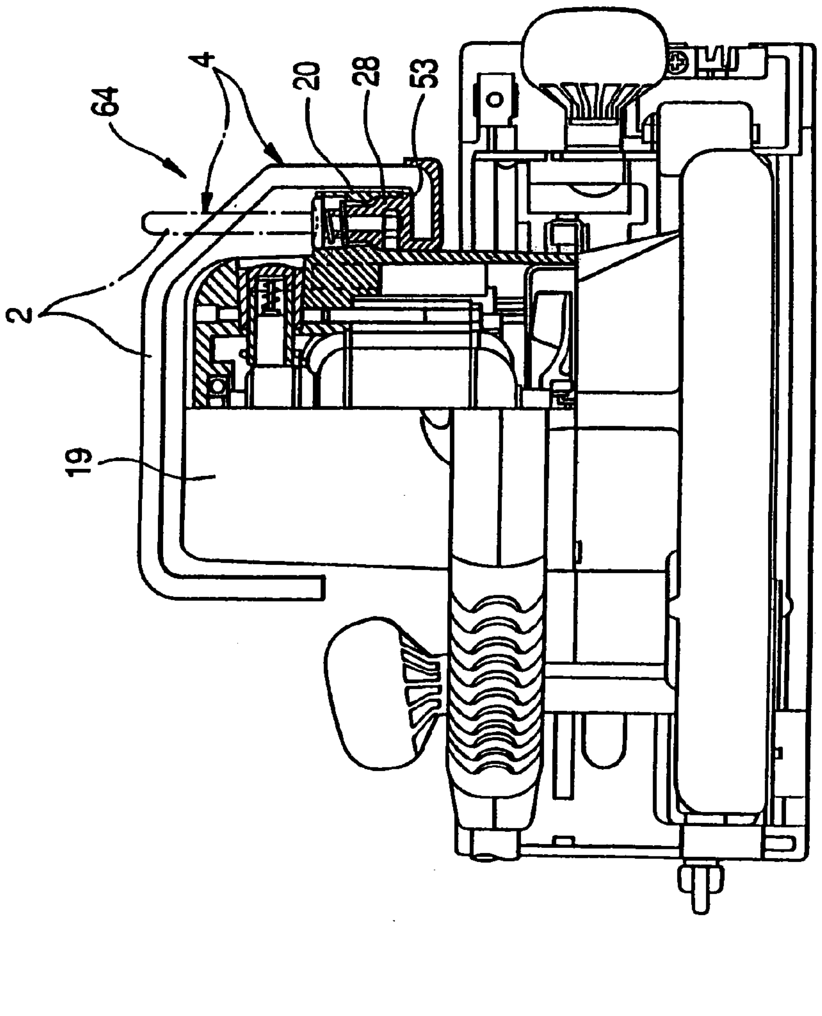
Figure 12B:
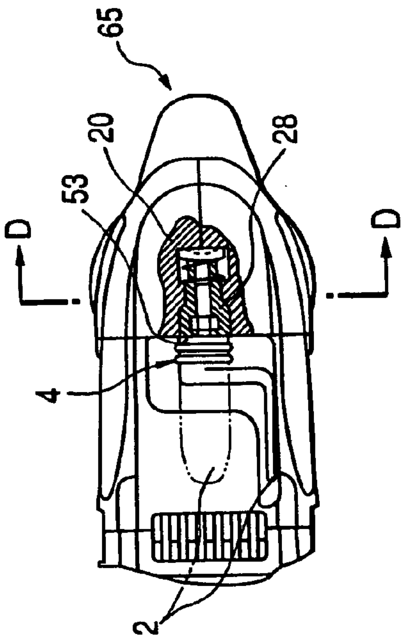
FIGS. 12A, 12B, and 12C illustrate an electric drill having the hook portion according to the invention and are a partly longitudinal front view thereof, a partly omitted plan view thereof, and a sectional view thereof taken on line D-D of FIG. 12B, respectively.
Figure 12C:
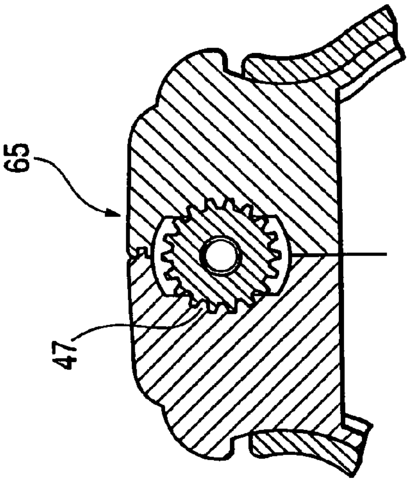
Figure 12A:
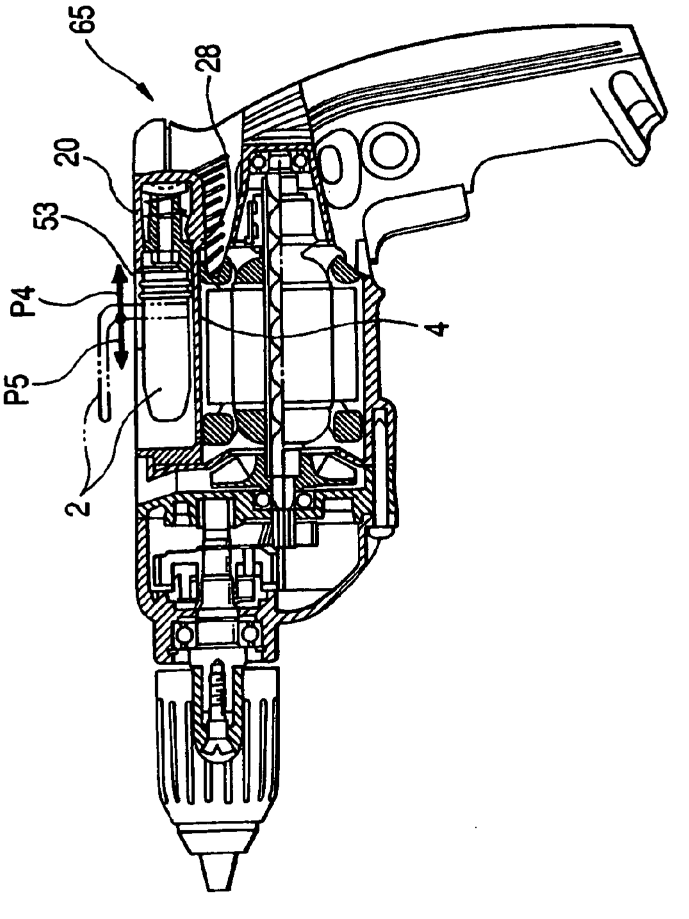
Figure 13:
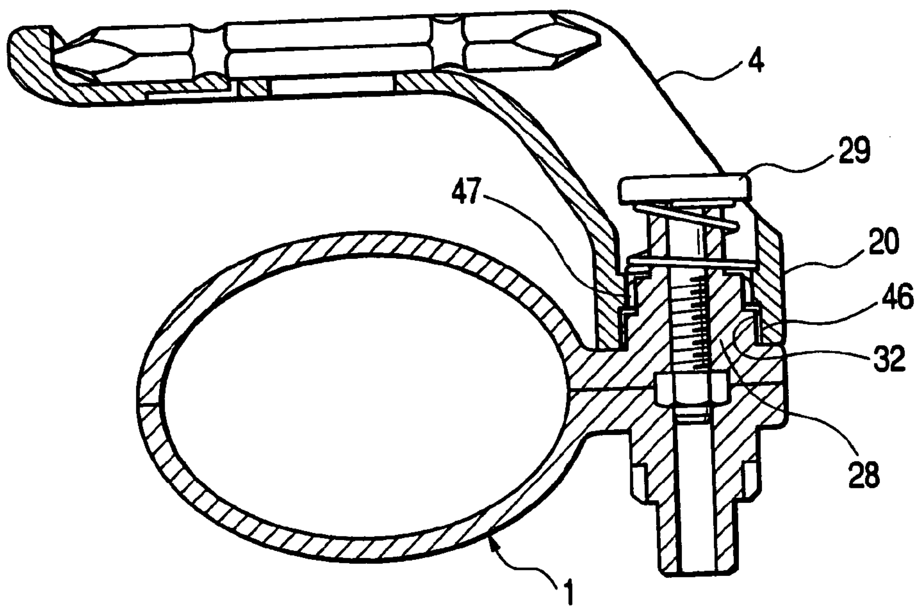
FIG. 13 is an enlarged sectional view illustrating a primary part of another example of the hook portion according to the invention.
Figure 14:
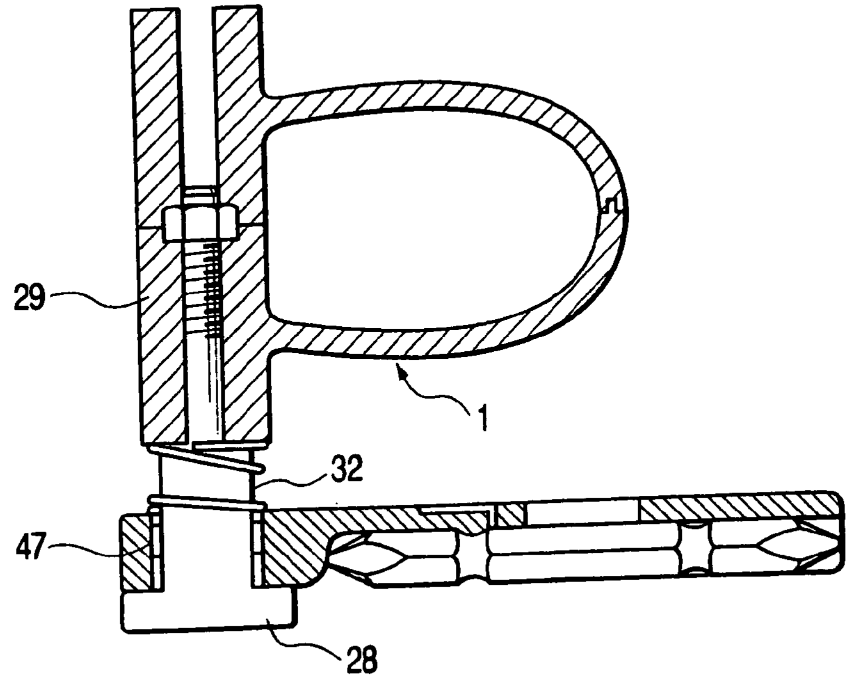
FIG. 14 is an enlarged sectional view illustrating a primary part of still another example of the hook portion according to the invention.
Figure 15:
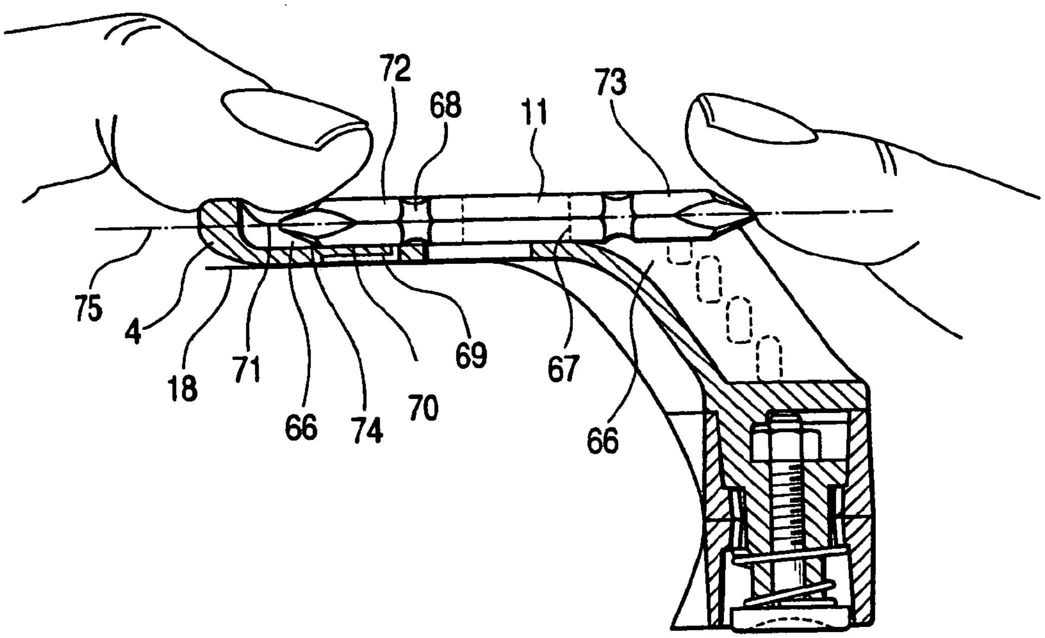
FIG. 15 is a sectional view illustrating a bit accommodating part provided in the hook portion according to the invention and taken on line A-A of FIG. 3A.
Figure 16:
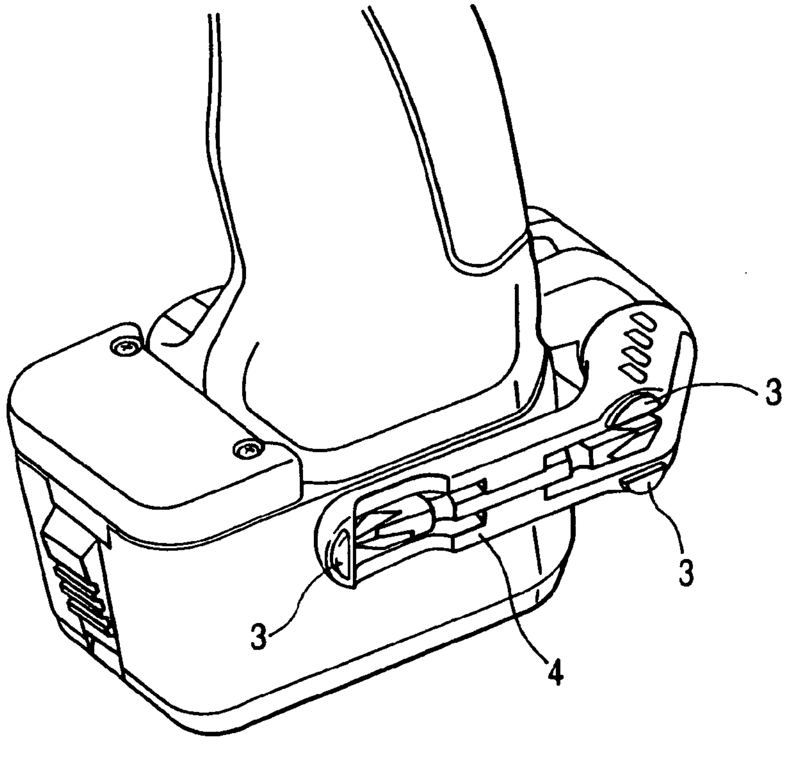
FIG. 16 is a partly external perspective view illustrating the hook portion accommodating a bit according to the invention.
Figure 17:
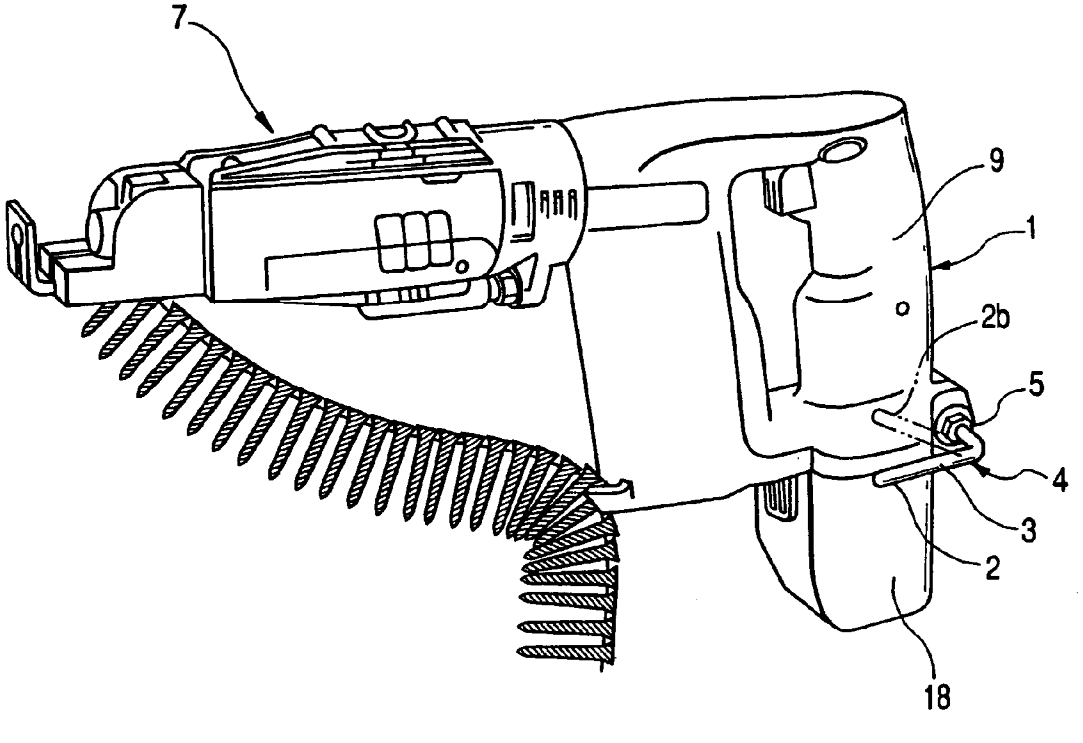
FIG. 17 is an external perspective view illustrating a conventional power tool having a hook.

FIGS. 3A, 3B, and 3C illustrate a moving state of the hook portion according to the invention and are a plan view, a side view, and a bottom view thereof, respectively. FIGS. 4A and 4B are sectional views taken on line A-A of FIG. 3A. FIG. 5 is a sectional view illustrating a state of the hook portion moved in a direction, in which a spring 27 is compressed, according to the invention, and taken on line A-A of FIG. 3A. FIG. 6 is an external perspective view illustrating a state in which the hook portion according to the invention is attached to the opposite side of the power tool. FIG. 7 is a sectional view illustrating an accommodated state or a projected state of the hook portion according to the invention, and taken on line B-B of FIG. 4A. FIGS. 8A and 8B illustrate a turning part of the hook portion according to the invention, and are a sectional view taken on line C-C of FIG. 4A and a partly enlarged view showing a gear and a ring gear, respectively. FIG. 9 is an enlarged view illustrating a primary part of the power tool in a state in which the power tool is hooked to a waist belt of an operator by using the hook portion according to the invention. FIGS. 10A, 10B, and 10C illustrate the primary part of the power tool in the state, in which the power tool is hooked to the waist belt of an operator by using the hook portion according to the invention, and are an explanatory view illustrating a state in which the power toll is hooked to the waist belt of the operator, an explanatory view illustrating a state in which a bit is removed from the power tool shown in FIG. 10A and a chuck and an auger bit are attached thereto, and an explanatory view illustrating a state in which a lightweight battery is attached to the power tool shown in FIG. 10A. FIGS. 11A and 11B illustrate an electric circular saw having the hook portion according to the invention, and are a partly longitudinal side view thereof and a constitutional view illustrating a state in which the electric circular saw is hooked to a beam, respectively. FIGS. 12A, 12B, and 12C illustrate an electric drill having the hook portion according to the invention and are a partly longitudinal front view thereof, a partly omitted plan view thereof, and a sectional view thereof taken on line D-D of FIG. 12B, respectively. FIG. 13 is an enlarged sectional view illustrating a primary part of another example of the hook portion according to the invention. FIG. 14 is an enlarged sectional view illustrating a primary part of still another example of the hook portion according to the invention. FIG. 15 is a sectional view illustrating a bit accommodating part provided in the hook portion according to the invention and taken on line A-A of FIG. 3A. FIG. 16 is a partly external perspective view illustrating the hook portion accommodating a bit according to the invention.

As shown in FIG. 3A, an impact driver having a two-piece housing 1 (hereunder referred to simply as a housing) and an enclosure, such as a hammer case 8, is nearly T-shaped. A main body portion constituted by the housing 1 accommodates a motor 15, which serves as an electric or pneumatic driving force source, and a planetary gear portion 18 constituting a speed reducer portion. Moreover, the handle portion hanging from the main body portion accommodates a trigger switch for supplying electric power to the motor 15, and contacts electrically connected to terminals of the storage battery. Further, the hammer case 8 placed in such a way as to abut against the housing 1 accommodates a striking force generating portion for converting torque of the motor 15 into a striking force, and a tip tool holding portion for holding tip tools, such as a bit and a wrench.

With such configuration, the torque of the motor 15 is transmitted from a pinion connected to as an output shaft of the motor 15 to the speed reducer portion. Then, the torque and the striking force are transmitted from the speed reducer portion to the tip tool 17 through the striking force generating portion.

The striking force generating portion comprises a spindle 16, a hammer 23 that is enabled to rotate through a steel ball inserted into a cam groove formed in the spindle 16 and that is enabled to move in a direction of axis of rotation thereof, an anvil 22 having an anvil jaw rotated by being struck by a plurality of hammer claws provided on the hammer 23, and a spring adapted to push the hammer 23 toward the anvil 22 at all times.

The planet gear portion 18 serving as the speed reducer portion comprises a stationary gear supporting jig that has a rotation stopper and is supported in the housing 1, a stationary gear, and a needle pin that has the spindle 16 and that serves as the axis of rotation of the planetary gear supported by the spindle 16.

Pulse-like impact is applied onto screws and nuts, which are screwed by the tip tool 17, as follows. That is, first, electric power is supplied to the motor 15 by operating the trigger switch. Thus, the motor 15 is driven to rotate. The torque of this motor 15 is transmitted to the spindle 16 through the pinion, which is connected to an end of the shaft of the motor 15, and the planetary gear portion 18 (that is, the planetary gear and the stationary gear). Then, the torque of the spindle 16 is transmitted to the hammer 23 through the steel ball disposed between the cam groove of the spindle 16 and that of the hammer 23. Subsequently, the hammer jaw of the hammer 23, which is frontwardly pushed (that is, pushed to the tip-tool side) by a spring disposed between the hammer 23 and the planetary gear supported by the spindle 16, engages with the anvil claw of the anvil 22, so that the anvil 22 rotates. Thus, torque is provided to the tip tool 17. When the value of the fastening torque of the tip tool 17 is equal to or higher than a predetermined value, the hammer jaw gets over the anvil claw. Thus, the engagement between the hammer jaw and the anvil claw is temporarily canceled. That is, when the value of the fastening torque is equal to or higher than a predetermined value, the hammer 23 moves (or retreats) against the force of the spring toward the side of the motor 15. Thereafter, the hammer 23 is pushed by a compressing force of the spring in the direction of the anvil 22, so that the hammer jaw collides with the anvil claw. Consequently, a striking force is produced. Thus, continuous impact torque is provided to the tip tool 17 by repeatedly performing the rotation and axial movement of the hammer 23 in this manner.

Further, an elastomer is applied onto the surface of the housing 1 of the power tool having the planetary gear 18 by double-layer molding. An object of providing this elastomer thereon is to prevent the slip-off of the handle portion so that the power tool is securely gripped, or to improve the feeling of gripping the power tool and enhance the operability and workability of the power tool. Moreover, the provision of the elastomer thereon is performed in order to absorb impact caused when the power tool is dropped to the ground, and to prevent the power tool from being damaged and from slipping down along a slope when the power tool is put on the slope. Therefore, the elastomer 15 is provided mainly on the handle grip portion of the two-piece housing 1 and around the main body portion.

Furthermore, a turnable hook portion 4 (to be described in detail later) is provided in the impact driver so as to hook an impact driver body onto a waist belt of an operator. The catching piece 2 of the hook portion 4 is provided in a cylindrical holding portion 20 extended from the accommodatable handle portion to a position adjoining a side surface of a battery 18. The holding portion 20 has a shaft length in a lateral direction (that is, a direction from the upper side to the lower side of paper, on which FIG. 3A is drawn, and vice versa) in which the base end portion 28 of the hook 4 is attached. Further, a shank 29 of a bolt 44 is passed through the holding portion 20 from the rear end of the handle 9. An accommodating portion for storing the bit 11 is provided in the resin catching piece 2.

As shown in FIGS. 1 and 2, the hook 4 comprises an L-shaped catching piece 2, a nearly cylindrical base end portion 28 provided in range with the rear end of the catching piece 2, and a slip-off preventing part 29 to be attached to this base end portion 28. The base end portion 28 is constituted by a cylindrical rotary tube 32 provided in such a way as to protrude from the catching piece 2 and have a gear portion 31 at an end portion thereof, a transverse cylinder 33 provided in such a manner as to project from the rotary tube 32 and have a diameter nearly equal to the inside diameter of the gear portion 31, and a bolt receiving tube 34 provided in such a way as to protrude therefrom and have a diameter that is less than the diameter of the transverse tube 33, which are consecutively provided on the pivot shaft 30. A semi-hexagonal-wall nut accommodating portion 35, on which latch projections (not shown) are provided in such a way as to protrude therefrom, and a bolt hole 36, which is passed through the pivot shaft 30 through an end surface of the bolt receiving tube 34 to the nut accommodating portion 35, are embedded in the base end portion 28. Additionally, the gear portion 31 is constituted by a plurality of gears each of which has a face in the direction of the pivot shaft 30 and projects outwardly from the base end portion 28 in the radial direction of the pivot shaft 30. Reference numeral 38 designates a step-like part formed between the catching piece 2 and the rotary tube 32. Reference numeral 39 denotes a rotation restricting piece for restricting a turning range of the catching piece 2, the turning of which is enabled by pulling the catching piece 2 toward a side opposite to the handle and canceling the mesh between the gear portion 31 and the ring gear portion 47, within a predetermined range of angle. Reference numerals 40-40 designate C-face portions respectively provided at ends of gears. Reference numerals 54-54 denote nonslip portions. Furthermore, the slip-off preventing portion 29 is constituted by a bolt 44 having a bolt head 43, in which a coin groove 42 is embedded, and a nut 45, which has a locking portion.

On the other hand, the holding portion 20 provided in the housing 1 is shaped in such a way as to be symmetric with respect to a partitioning face between the housings 1*a* and 1*b*. The holding portion 20 is cylindrically shaped and has a through hole 50 connected to the pivot shaft 30 comprising a rotation supporting hole 46 abutting against the rotary tube 32 of the hook 4 that constitutes the rotation supporting portion together with the holding portion 20, a ring gear portion,47 into which the gear portion 46 of the hook 4 is fittable, a spring receiving portion 48 shaped in such a way as to be symmetrical with this ring gear portion 47 and to have an end face thereof abutting against the elastic spring 27, and a spring chamber 49 shaped in such a way as to be symmetrical with the rotation supporting hole 46 and to be able to accommodate the spring 27 and the bolt head 43, which adjoin the periphery of the bolt receiving tube 34 of the hook 4. Additionally, the ring gear portion 47 is constituted by a plurality of gears that have faces in the direction of the pivot shaft 30 and are protruded from the through hole 50 to the inside in the direction of the radial direction of the pivot shaft 30. Furthermore, the rotation restricting plate 39 of the hook 4 abuts against the inner surface of the rotation supporting hole 46. Further, the rotation-restricting-plate receiving portion 52 is cylindrically shaped in such a manner as to be concentric with and embedded in the rotation supporting hole 46. The size in the circumferential direction of the rotation-restricting-plate receiving portion 52 is a several times that in such a direction of the rotation restricting plate 39. Both the rotation-restricting-plate receiving portion 52 and the rotation restricting plate 39 are formed so that when the hook 4 is assembled to the holding portion 20, both the receiving portion 52 and the restricting plate 39 are longer than the distance in the direction of the pivot shaft 3ρ from the inner surface of the bolt head 43 to an end face of the spring receiving portion 48. Additionally, the step-like part 38 of the hook 4 is made to abut against an end face 53 of the holding portion 20, so that these portions 20 and 38 constitute a disengagement preventing portion. Incidentally, elastic rubber is used as a resilient body that is other than the spring 27.

When the hook 4 is assembled to the housing in the impact driver 21 constructed as described above, the nut 45 is inserted into the nut accommodating portion 35 of the hook 4. Then, the base end portion 28, in which the nut 45 is caught by using latching projections (not shown) and accommodated, of the hook 4 is attached into the through hole 50 of the holding portion 20 of the already screwed housings 1*a* and 1*b* so that the catching piece 2 is parallel to the bottom surface of the battery 18. Moreover, the hook 4 is assembled to the housing 1 through the spring 27 in the case that the bolt 44 is passed through the bolt hole 36 and the nut 45 is tighten by fitting a slotted driver bit or a coin into the coin groove 42 until the bolt head 43 abuts against an end face of the bolt receiving tube 34 during the driver 21 is in a state in which the spring 27 is inserted into the spring chamber 49 from the direction of a larger-diameter side portion thereof. Furthermore, the nut 45 is a nut having a locking function. Thus, there is no danger that the screw 44 works loose and the hook 4 is disengaged from the housing 1. Furthermore, at that time, the holding portion 20 is shaped in such a way as to be symmetrical with respect to the partitioning face between the housings 1*a* and 1*b*. Thus, as shown in FIG. 6, the hook 4 can be attached thereto from a direction opposite to the holding portion 20, depending upon the dominant arm of an operator. Even when the attaching direction is changed, the roles of parts of the holding portion 20 change, except the ring gear portion 47. Therefore, even when the holding portion 20 has two places as the attaching position, at which the hook 4 is to be attached, it is substantially sufficient that only one of the two places is employed as the attaching position. In other words, there is no necessity for providing two places as the mounting position of the hook 4. Thus, the impact driver 21 becomes compact. Further, at that time, the nut 45 serving as a general-purpose part is inserted into the nut accommodating portion 35 of the hook 4, as shown in FIGS. 1 and 2. Consequently, the cost of this embodiment of the invention is low, as compared with the case of employing an insert molding method, according to which the nut is formed by fitting a resin material into a metal mold and then performing resin-molding, and another method, according to which the entire base end portion 28 is formed by using metal and the formed base end portion 28 is machined. Moreover, in the case of this embodiment of the invention, the hook 4 is fixed to the housing by screwing the bolt 44 into the nut 45. Thus, the durability of the driver 21 is high, as compared with that of a driver formed according to a method of screwing the hook 4 into the resin-molded housing 1.

FIGS. 4A and 4B illustrate an accommodating state in which the catching piece 2 of the hook 4 is accommodated at a position nearly adjoining a side surface of the battery 18. The pressure of the spring 27 is applied in a direction, in which the bolt head 34 is pushed out, by employing an end face part of the spring receiving portion 48 in the holding portion 20 as a fulcrum. Moreover, the step-like part 38 is made to abut against the end face 53 of the holding portion 20. The hook 4 is supported in this way, so that the hook 4 is prevented from being detached from the housing. Furthermore, the gear portion 31 is held in a fitting state in which the gear portion 31 and the ring gear portion 47 are fitted to each other. Thus, the base end portion 28 is prevented from being rotated in the circumferential direction of the pivot shaft 30. Additionally, when the piece 2 of the hook 4 is accommodated therein, the condition of the hook 4 is stabilized.

Further, in the case that the hook 4 is then used from this position, an operator pinches the nonslip portions 54 and 54 provided on the pivot shaft 30 with his fingers and pulls these portions out sideways in the direction of the pivot shaft 30 (that is, in the upward direction, as viewed in FIG. 4A). Thus, as illustrated in FIG. 5, the hook 4 is enabled to move sideways from the holding portion 20. Moreover, the engagement between the gear portion 31 and the ring gear portion 47 is canceled. Consequently, the hook 4 can be turned. Incidentally, in this state, the bolt head 43 is locked on the end face of the spring receiving portion 48 through the compressed spring 27. Thus, the hook 4 is prevented from being disengaged therefrom sideways. Furthermore, when the hook 4 is drawn out, the spring 27 is cone-shaped and thus can be compressed so that the thickness thereof is reduced to a wire diameter. Consequently, a large pull-out amount of the hook 4 is obtained. In other words, the holding portion 20 can be compacted in width in the direction of the pivot shaft 30. Then, the hook 4 is turned directly from the pulled-out state of the nonslip portions, which is shown in FIG. 5 and maintained by the fingers, so that the tip end of the catching piece 2 is upwardly directed as illustrated in FIG. 3A. When the operator opens his fingers and lets the nonslip portions 54 and 54 off at a position 2*e* in the vicinity of the center of gravity of the impact driver 21, as illustrated in FIG. 4A, the pressure of the spring 27 is applied in a direction, in which the bolt head 34 is pushed out, by employing the end face part of the spring receiving portion 48 in the holding portion 20 as a fulcrum. Moreover, the gear portion 31 and the ring gear portion 47 are fitted to each other. The step-like portion, 38 abuts against the end face 53 and is supported thereon. The catching piece 2 is stably fixed at the position 2*e* shown in FIG. 3A. When the hook 4 is turned, the rotary tube 32 abuts against the rotation supporting hole 46 and slides, as illustrated in FIG. 5. Thus, the hook 4 can be turned on the pivot shaft 30 at all times. Further, a plurality of gears are provided in the gear portion 31 and the ring gear portion 47. Additionally, the C-face portions 40 to 40 of the gear portion 31 serve as inspection openings. Thus, the gear portion 31 and the ring gear portion 47 are easily fitted to each other only by opening the fingers in the pulled-out state. Moreover, the C-face portions 40 to 40 have effects of preventing the loss of end parts of teeth of the gear portion 31. Therefore, although no C-face portions are provided on end parts of teeth of the ring gear portion in the impact driver 21 owing to the divided structure of the mold, C-face portions may be provided on the end parts of the teeth of the ring gear portion 47. Even when the gear portion 31 and the ring gear portion 47 are not fitted to each other only by opening the fingers, the gear portions 31 and 47 can be fitted to each other only by tapping the hook 4.

Further, when the hook 4 is not used, the hook 4 can be moved sideways and the fitting of the gear portion 31 to the ring gear portion 47 is canceled by pinching the catching pieces 54 and 54 with the fingers and then upwardly pulling these catching pieces reversely to the aforementioned procedure. Thus, the hook 4 can be turned. Then, the hook 4 is turned directly from the pulled-out state of the catching pieces, which is maintained by the fingers, so that the tip end of the catching piece 2 is frontwardly directed as illustrated in FIG. 3A. When the operator opens his fingers and lets the catching pieces 54 and 54 off in a position in which the end face of the rotation restricting plate 39 abuts against the end face of the rotation restricting plate receiving portion 52, the catching piece 2 of the hook 4 is accommodated at a position nearly adjoining a side surface of the battery 18.

Incidentally, the shapes of the gear portion 31 and the ring gear portion 47 are described in detail herein below. When a force P1 of the operator is applied to the end portion of the hook 4 in the circumferential direction of the pivot shaft 30 as illustrated in FIG. 8A, a moment M1 acts on a point of the fitted portion. However, the teeth of the gear portion 31 and the ring gear portion 47 are constituted by faces extending nearly in the radial direction of the pivot shaft 30. Thus, the moment M1 is acted upon the teeth of the ring gear portion 47 in a direction that is nearly perpendicular thereto. Consequently, the turning of the hook 4 is restrained without waste. Additionally, because a plurality of teeth are provided in each of the gear portion 31 and the ring gear portion 47 as illustrated in FIG. 8B, the moment M1 can be divided, into moments M2. Thus, each of the holding portion 20 and the base end portion 28 can be made to be compact and can be firmly fitted to each other. Furthermore, the teeth of each of the gear portion 31 and the ring gear portion 47 are constituted by faces extending in the direction of the pivot shaft 30, as illustrated in FIG. 1. Thus, even when a force is exerted in the turning direction of the hook 4, the hook 4 does not slide sideways in the direction of the pivot shaft 30 (that is, in a direction toward the upper side of paper, on which FIGS. 8A and 8B are drawn). Additionally, because the teeth of each of the gear portion 31 and the ring gear portion 47 project in the radial direction of the pivot shaft 30 from a corresponding one of the base end portion 28 and the through hole 50, the contact area between the surface of the tooth and that of a corresponding one of the base end portion 28 and the through hole 50 is large and the bonding strength therebetween is high, as compared with the configuration in which the teeth project in the axial direction of the pivot shaft 30 from the end faces of the base end portion 28 and the through hole 50. Further, in the case that a strength equal to the bonding strength of the teeth projecting in the radial direction of the pivot shaft 30 is obtained by employing the configuration in which the teeth protrude in the direction of the pivot shaft 30, the size in the radial direction of each of the gear portion 31 and the ring gear portion 47 is increased. Thus, this configuration is an unsuitable one.

Referring next to FIG. 9, there is shown a state in which the impact driver 21 is hooked to the waist belt 76. FIG. 9 illustrates a state in which a force P2 is applied onto the hook 4 in a pull-out direction as the operator operates the driver. Because the base end portion 28 is fitted into the through hole 50, the base end portion 28 turns when the force P2 is applied to a supporting point 26 to which the waist belt 7 is hooked. Moreover, moments M3 and M3 act on end points 56 and 56 of the base end portion 28 in the circumferential direction of the center 57 thereof. Further, each of the moments M3 and M3 is decomposed into a corresponding one of forces F1 and F1, which act on the inner wall of the through hole 50 in directions perpendicular thereto, and a corresponding one of forces F2 and F3, which act in parallel with each other in opposite orientations. However, the forces F2 and F3 cancel out. Consequently, the base end portion 28 is pressure-attached to the through hole 50 by the forces F1 and F1 acting upon the inner wall thereof in directions perpendicular thereto. In other words, the base end portion 28 is entangled in the through hole 50 and cannot be pulled out. Thus, the operator has no choice but to straightly pull out the hook 4 on the pivot shaft 30 with fingers. Therefore, when the hooked to the belt 76, the stability of the hooked state of the driver 21 is good. Furthermore, the gravity acts on the impact driver 21 at all times in a state the driver 21 is hooked to the belt 76. Thus, a force P3 acts upon the catching piece, so that a state, in which the base end portion 28 is entangled in the through hole 50, continues.

Further, when the impact driver 21 is hooked to the waist belt 76, the center of gravity of the impact driver 21 is positioned just below the supporting point 26 of the hook 4, as illustrated in FIG. 10A. The catching piece 2 extends perpendicularly to the waist belt 76 and is stable. Moreover, when an auger bit and a drill chuck 59 are attached thereto as shown in FIG. 10B, or when a low-voltage lightweight battery 60 is attached thereto as illustrated in FIG. 10C, the center of gravity of the impact driver 21 is changed to that 61 or 62 thereof. However, the catching piece 2 is held at a plurality of places positioned in the circumferential direction. Thus, when the catching piece 2 located at the position 2*e* is simply turned to the position 2*d* or 2*f*, the catching piece 2 is perpendicular to the waist belt 76 at all times and deeply hooked thereto. Therefore, even in the case that components are added to or altered in the driver, the stability thereof is good when the driver is hooked to the belt. Additionally, as described above, the hook 4 cannot strongly turn even when a force is applied thereto in the turning direction. Furthermore, the hook 4 is not pulled out as the motion of the operator proceeds. Moreover, the stability of the driver, which is obtained when hooked to the belt, is maintained.

Next, the strength of the hook 4 in the case of dropping the impact driver 21 is described hereinbelow. When the catching piece 2 is located at the position 2*a* shown in FIG. 3A, the battery 18 absorbs impact. When located at the positions 2*c*, 2*d*, 2*e*, and 2*f*, the catching piece 2 bends toward and abuts against the handle 9, so that the handle 9 absorbs impact. However, when the catching piece 2 is located at a position other than the positions 2*c*, 2*d*, 2*e*, and 2*f*, for example, in the case that the catching piece 2 is subjected to impact when the driver 21 is dropped, the catching piece 2 should absorb the impact by itself. Thus, this driver has encountered a problem that naturally, the size of the catching piece 2 becomes large. Therefore, as illustrated in FIG. 7, the rotation restricting plates 39 and 52 are provided in the base end portion 28 and the holding portion 20, respectively. Thus, the range, in which the catching piece 2 turns and moves, is controlled in such a manner as to be within the range of position 2*a*, 2*c*, 2*d*, 2*e*, and 2*f*. Consequently, the hook 4 can be made to be compact.

The aforementioned configuration of the hook is implemented according to a simple method of allowing the hook to slide and turn within a range among a plurality of selected positions. The stability of the driver hooked to the belt is good. Further, the hook has a compact structure and is accommodated according to a method of causing the hook to adjoin a portable tool. Thus, similarly as the exemplified impact driver, most of the power tools according to the invention have no empty space in the housing and have only limited places to which the hook is attached. The invention can be widely applied to most of portable tools, such as a circular saw, a drill, a disk grinder, a driver, a hammer, a jigsaw, a cutter, a saver saw, an air tool, and a nailing machine. The general versatility thereof is high. Even in the case that a hook for hooking a circular saw 64 to a beam 60 of a roof is attached thereto as shown in FIGS. 11A and 11B, this power tool is configured so that the holding portion 20 is provided on a surface at the side of the motor housing 19 in such a way as to project therefrom, and that the catching piece 2 is U-shaped and adjoins an end face of the motor housing 19 in such a way as to be separated by a sliding amount of the hook 4. Thus, the hook 4 can be attached to an electric circular saw. Furthermore, in the case that the hook is attached to a drill 65, which is shown in FIG. 12A, 12B, and 12C, and has an empty space in an upper part of a motor, or to a screw driver, such a power tool can be configured so that the catching piece 2 is L-shaped in such a manner as to protrude in parallel with the pivot shaft, and that the hook 4 and the entire holding portion 20 are accommodated therein. That is, the hook can be attached to this drill or screw driver. FIG. 12C is a sectional view taken on line D-D of FIG. 12B. As shown in this figure, a part of the ring gear portion 47 may be omitted in the structure of the mold. Moreover, as described above, in both the circular saw and the drill, when hooked to the beam or the belt, the gravity P4 acts on the catching piece 2. However, the hook 4 is provided on the end face 53 of the holding portion 20 in such a way as to be prevented from being slipped off, and as to be stable. Furthermore, when the catching piece 2 is pulled off the beam and the belt, a force P5 acts on the catching piece 2 owing to friction. However, the base end portion 28 of the hook 4 is entangled in the holding portion 20. Thus, the hook 4 is made to slide. This prevents the hook 4 from becoming hard to pull out. Therefore, the operability of such a power tool is good.

Further, the base end portion 28 is provided in the hook 4, and the holding portion 20 is provided in the housing 1, similarly as the tool illustrated in FIGS. 4A and 4B. However, even in the configuration in which the holding portion 20 is provided in the hook 4 and in which the base end portion 28 is provided in the housing 1, as illustrated in FIG. 13, similar effects can be obtained. Moreover, the power tool may have the configuration in which the housing 1 including the base end portion 28 shown in FIG. 13 is replaced with the slip-off preventing portion 29, as illustrated in FIG. 14. Furthermore, the rotation supporting hole 46 for supporting the rotation of the notary tube 32 during the turn of the hook 4 shown in FIG. 13 may be omitted. Additionally, the rotary tube 32 may be supported by the ring gear portion 47 as illustrated in FIG. 14. Operating accuracy may be enhanced by replacing the components or subdividing the component. Alternatively, the power tool may be configured so that a single component serve to perform both of two functions to thereby obtain both of two kinds of corresponding effects.

Next, the configuration of the portion for accommodating the bit, and the method therefor are described hereinbelow. FIG. 1 is a partly explanatory view illustrating the impact driver having the hook. A bit accommodating portion 66 serving as a groove-like accommodating/holding portion is provided in the catching piece 2 of the hook 4 in such a manner as to be depressed therein. A hexahedral bit 11 is almost completely accommodated in the bit accommodating portion 66. Reference numeral 67 designates a fitting portion to which the bit 11 can be fitted. Reference numeral 68 denotes a neck portion formed by denting front and rear parts of the bit 11. Reference numeral 69 designates a stopper provided on an elastic flat-plate 70 in such a way as to project therefrom and as to be able to elastic lock the neck portion. Reference numeral denotes a cutout formed by partly cutting a side wall of bit accommodating portion 1. Reference numerals 72 and designate head portions of the bit 11. Reference numeral denotes a concave portion formed in a rear surface portion the flat plate 70.

On the other hand, when the bit 11 is attached thereto, as shown in FIG. 15, the head portion 73 thereof is pushed from the direction of the rear part of the bit accommodating portion 66 (that is, from the right side in the figure) by a finger and thus caused to slide in the direction of the bit axis. Thus, the bit 11 is fitted to the fitting portion 67. The neck portion 68 of the bit 11 is elastically locked by the stopper 69, so that the bit 11 is assembled to the hook 4. Further, FIGS. 4A and 4B are views illustrating a state in which the bit 11 is accommodated in the hook 4. FIG. 4B is a sectional view taken on line E-E of FIG. 4A. Three faces of the hexahedral bit 11 are held in the fitting portion 67 in a fitting state. The bit 11 is prevented from rocking in the circumferential and radial directions of the bit axis 75. Additionally, the stability of the tool is good. Furthermore, the bit 11 is accommodated in such a way as to be flush with the edge portion of the catching piece 2, that is, the bit 11 is completely embedded therein so that the outer periphery of the bit 11 does not project from the bit accommodating portion 66. Thus, there is no danger that the bit 11 is caught in clothes and detached therefrom. Consequently, the power tool of the invention excels in safety. Subsequently, when the bit 11 is pulled out as shown in FIG. 15, a finger is inserted into the cutout 71 of the bit accommodating portion 66. Then, the head portion 72 is caused to rearwardly slide (that is, to the right side, as viewed in this figure). Thus, the stopper 69 or the flat plate 70 is pushed by the head portion 72, so that the flat plate 70 is bent to thereby cancel the locking state, in which the bit 11 is locked by the stopper 69. Moreover, the head portion 73 can be made to protrude therefrom to the rearward direction. When the head portion 73 is pinched by fingers and then pulled out, the bit 11 is pulled out from the hook 4. At that time, the elastic pressure of the flat plate 70 is lowered by a concave portion 74. Moreover, even when the catching piece 2 abuts against the side surface of the battery 18, the bent flat plate 70 does not collide with the side surface of the battery 18.

Therefore, as described above, when the catching piece of the hook is replaced with the bit accommodating portion in the portable tool having the hook and the bit accommodating portion, the efficiency in space utilization is good. Further, according to the method of detaching the bit by causing the bit to slide in the direction of the bit axis, the integral resin-molding of the hook is enabled by dividing the bit accommodating/holding portion into swing restricting means for restricting the bit shaft from swinging circumferentially and radially, and elastic lock means for elastically stopping a swing in the axial direction of the bit shaft. Consequently, the cost and assembling time of the tool are saved.

Furthermore, when antislipping or member-protecting soft materials, such as rubber materials 3 and 3, are press-fitted into or bonded to a part of the edge portion of the catching piece 4 or double-layer molded, as illustrated in FIG. 16, the soft material can be provided in the hook having the bit accommodating portion. Incidentally, a method of applying a soft coating material onto the hook may be employed.

As is seen from the foregoing description, the bit accommodating portion using the integral resin-molded latch means, which has good efficiency in utilization of the space and which is enabled to save the cost and the assembling time, can be widely applied not only to the exemplified impact driver but to the portable tools, such as a circular saw using a bit, a screw driver, a driver drill, and a driver for a air tool.

According to the invention, the power tool includes a hook portion comprising a hook holding portion, which is provided in a housing and has engaging teeth provided in a housing, and also comprises a hook having a shaft portion, which is inserted into the hook holding portion and provided with fitting teeth meshing with the engaging teeth, an elastic body adapted to push the hook against a handle portion at all times, and a slip-off preventing part holding portion adapted to move the hook in a direction of an axis thereof against a force of the elastic body and to cancel the mesh between the teeth to thereby enable the hook to turn. Thus, the invention provides a power tool that is enabled to easily change the position of the hook with respect to the tool body and that excels in operability. Moreover, the accommodating/holding portion is caused to hold a tip tool, such as a bit. Thus, the invention provides a power tool enabled to enhance workability and effectively use a space. Furthermore, the invention provides a hook having excellent usability, in which the bit is arranged in such a way as to reliably be held in the accommodating/holding portion and to easily be detached therefrom, and also provides a detaching method therefor.

What is claimed is:

1. A portable tool having a housing and a hook arrangement provided on said housing, said hook arrangement comprising:

a holding portion in a part of said housing, said holding portion having opposite sides and a through hole extending through said holding portion, including through said opposite sides; and a hook having a catching portion and an end portion extending from said catching portion, said end portion being received in said through hole and turnably attached to said holding portion, wherein said end portion includes a first uneven portion, said holding portion includes at least one second uneven portion, at least one of said at least one second uneven portion engages with said first uneven portion, and said holding portion is symmetric with respect to a plane that extends through said holding portion without passing through said opposite sides, whereby said hook can be turnably attached to said holding portion at either side of said holding portion.

2. A portable tool having a housing and a hook arrangement provided on said housing, said hook arrangement comprising:

a holding arrangement on a part of said housing, said holding arrangement having opposite sides and a through hole arrangement through said holding arrangement, including through said opposite sides; and a hook having a catching portion and an end portion extending from said catching portion, said end portion being received in said through hole arrangement and turnably attached to said holding arrangement, wherein said end portion includes a first uneven portion, said holding arrangement includes at least one second uneven portion, at least one of said at least one second uneven portion engages with said first uneven portion, and said holding arrangement is symmetric with respect to a plane that extends through said holding arrangement without passing through said opposite sides, whereby said hook can be turnably attached to said holding arrangement at either side of said holding arrangement.

3. A portable tool having a housing and a hook arrangement provided on said housing, said hook arrangement comprising:

a holding portion in a part of said housing, said holding portion having opposite sides and a through hole extending through said holding portion, including through said opposite sides; and a hook having a catching portion and an end portion extending from said catching portion, said end portion being received in said through hole and turnably attached to said holding portion, wherein said end portion includes a first uneven portion, said holding portion includes at least one second uneven portion, and at least one of said at least one second uneven portion engages with said first uneven portion, whereby said hook can be turnably attached to said holding portion at either side of said holding portion.

4. A portable tool having a housing and a hook arrangement provided on said housing, said hook arrangement comprising:

a holding portion in a part of said housing, said holding portion having opposite sides and a through hole extending through said holding portion, including through said opposite sides; and a hook having a catching portion and an end portion extending from said catching portion, said end portion being received in said through hole and turnably attached to said holding portion, wherein said end portion includes a first uneven portion, said holding portion includes a second uneven portion engaging with said first uneven portion, and wherein said holding portion is symmetric with respect to a plane that extends through said holding portion without passing through said opposite sides, a first part of said second uneven portion lying on one side of said plane and engaging with said first uneven portion when said hook is turnably attached at one side of said holding portion, and a second part of said second uneven portion lying on the other side of said plane and engaging with said first uneven portion when said hook is turnably attached at the other side of said holding portion, whereby said hook can be turnably attached to said holding portion at either side of said holding portion.

5. A portable tool having a housing and a hook arrangement provided on said housing, said hook arrangement comprising:

a holding arrangement in a part of said housing, said holding arrangement having opposite sides and a through hole arrangement extending through said holding arrangement, including through said opposite sides; and a hook having a catching portion and an end portion extending from said catching portion, said end portion being received in said through hole arrangement and turnably attached to said holding arrangement, wherein said end portion includes a first uneven portion, said holding arrangement includes a second uneven portion engaging with said first uneven portion, and wherein said holding arrangement is symmetric with respect to a plane that extends through said holding arrangement without passing through said opposite sides, a first part of said second uneven portion lying on one side of said plane and engaging with said first uneven portion when said hook is turnably attached at one side of said holding arrangement, and a second part of said second uneven portion lying on the other side of said plane and engaging with said first uneven portion when said hook is turnably attached at the other side of said holding arrangement, whereby said hook can be turnably attached to said holding arrangement at either side of said holding arrangement.

6. A portable tool having a housing and a hook arrangement provided on said housing, said hook arrangement comprising:

a holding portion in a part of said housing, said holding portion having opposite sides and a through hole extending through said holding portion, including through said opposite sides; and a hook having a catching portion and an end portion extending from said catching portion, said end portion being received in said through hole and turnably attached to said holding portion, wherein said end portion includes a first uneven portion, said holding portion includes a second uneven portion engaging with said first uneven portion, a plane extends through said holding portion without passing through said opposite sides, a first part of said second uneven portion lies on one side of said plane and engages with said first uneven portion when said hook is turnably attached at one side of said holding portion, and a second part of said second uneven portion lies on the other side of said plane and engages with said first uneven portion when said hook is turnably attached at the other side of said holding portion, whereby said hook can be turnably attached to said holding portion at either side of said holding portion.

7. A portable tool having a housing and a hook arrangement provided on said housing, said hook arrangement comprising:

a holding portion in a part of said housing, said holding portion having opposite sides and a through hole extending through said holding portion, including through said opposite sides; and a hook having a catching portion and an end portion extending from said catching portion, said end portion being received in said through hole and turnably attached to said holding portion, wherein said end portion includes a first uneven portion, said holding portion includes at least two second uneven portions, and wherein said holding portion is symmetric with respect to a plane that extends through said holding portion without passing through said opposite sides, a first of said second uneven portions lying on one side of said plane and engaging with said first uneven portion when said hook is turnably attached at one side of said holding portion, and a second of said second uneven portions lying on the other side of said plane and engaging with said first uneven portion when said hook is turnably attached at the other side of said holding portion, whereby said hook can be turnably attached to said holding portion at either side of said holding portion.

8. A portable tool having a housing and a hook arrangement provided on said housing, said hook arrangement comprising:

a holding arrangement in a part of said housing, said holding arrangement having opposite sides and a through hole extending through said holding arrangement, including through said opposite sides; and a hook having a catching portion and an end portion extending from said catching portion, said end portion being received in said through hole and turnably attached to said holding arrangement, wherein said end portion includes a first uneven portion, said holding arrangement includes at least two second uneven portions, and wherein said holding arrangement is symmetric with respect to a plane that extends through said holding arrangement without passing through said opposite sides, a first of said second uneven portions lying on one side of said plane and engaging with said first uneven portion when said hook is turnably attached at one side of said holding arrangement, and a second of said second uneven portions lying on the other side of said plane and engaging with said first uneven portion when said hook is turnably attached at the other side of said holding arrangement, whereby said hook can be turnably attached to said holding arrangement at either side of said holding arrangement.

9. A portable tool having a housing and a hook arrangement provided on said housing, said hook arrangement comprising:

a holding portion in a part of said housing, said holding portion having opposite sides and a through hole extending through said holding portion, including through said opposite sides; and a hook having a catching portion and an end portion extending from said catching portion, said end portion being received in said through hole and turnably attached to said holding portion, wherein said end portion includes a first uneven portion, said holding portion includes at least two second uneven portions, and wherein a plane extends through said holding portion without passing through said opposite sides, a first of said second uneven portions lying on one side of said plane and engaging with said first uneven portion when said hook is turnably attached at one side of said holding portion, and a second of said second uneven portions lying on the other side of said plane and engaging with said first uneven portion when said hook is turnably attached at the other side of said holding portion, whereby said hook can be turnably attached to said holding portion at either side of said holding portion.

10. A portable tool having a housing, a hook arrangement provided on said housing, a front at which a workpiece engaging part is positioned and a top, said hook arrangement comprising:

a holding portion on said housing, said holding portion having a hole; and a hook having a catching portion and an end portion, said catching portion having a tip, and said end portion being received in said hole and turnably attached to said holding portion, wherein said end portion includes a first uneven portion, said holding portion includes a second uneven portion, said second uneven portion engaging with said first uneven portion, and wherein said end portion has a first turning range limiting structure, said holding portion has a second turning range limiting structure, and said first and second turning range limiting structures are arranged to interact with one another to limit the range of turning of the hook between a position in which the tip of said catching portion is directed frontwardly and a position in which the tip of said catching portion is directed upwardly, whereby said hook can be turned, within the limited range, on said holding portion.

11. The portable tool according to claim 10, wherein said second turning range limiting structure comprises an arcuate recess in a portion of said holding portion that defines said hole, and said first turning range limiting structure comprises an element that protrudes into said recess.

12. The portable tool according to claim 11, wherein said end portion is axially movable relative to said holding portion between first and second positions in order to enable turning of the hook, and said element protrudes into said recess when said end portion is in all of the axial positions of from said first position to said second position.

13. The portable tool according to claim 10, wherein the portable tool has a center of gravity, and said limited range extends to opposite sides of the center of gravity.

14. The portable tool according to claim 10, wherein the portable tool also has a battery and, in all of the positions of said hook within the limited range, said catching portion is in alignment with at least one of the housing and the battery in a direction parallel to the axis of turning of said hook and sufficiently close to at least one of the housing and the battery that said hook abuts at least one of the housing and the battery in response to impacts on said hook in the general direction of the axis of turning of said hook, whereby at least one of the housing and the battery helps absorb the impacts.

15. The portable tool according to claim 1, wherein said hook comprises non-slip portions.

16. The portable tool according to claim 1, wherein said first uneven portion comprises an arcuate shape.

17. The portable tool according to claim 1, wherein said second uneven portion comprises an arcuate shape.

18. The portable tool according to claim 1, wherein said hook comprises a nut accommodating portion and a nut disposed in said nut accommodating portion.

19. The portable tool according to claim 18, further comprising a bolt extending through the through hole of said holding portion.

20. The portable tool according to claim 19, wherein said bolt is received in said nut.

* * * * *